May 31, 1938.  H. SACK  2,119,059
DRIVING DEVICE FOR MULTIROW DRILL BARROWS OF FERTILIZER
SPREADING MACHINES WITH ROTARY DISTRIBUTING MEMBERS
Filed May 14, 1934  3 Sheets-Sheet 1
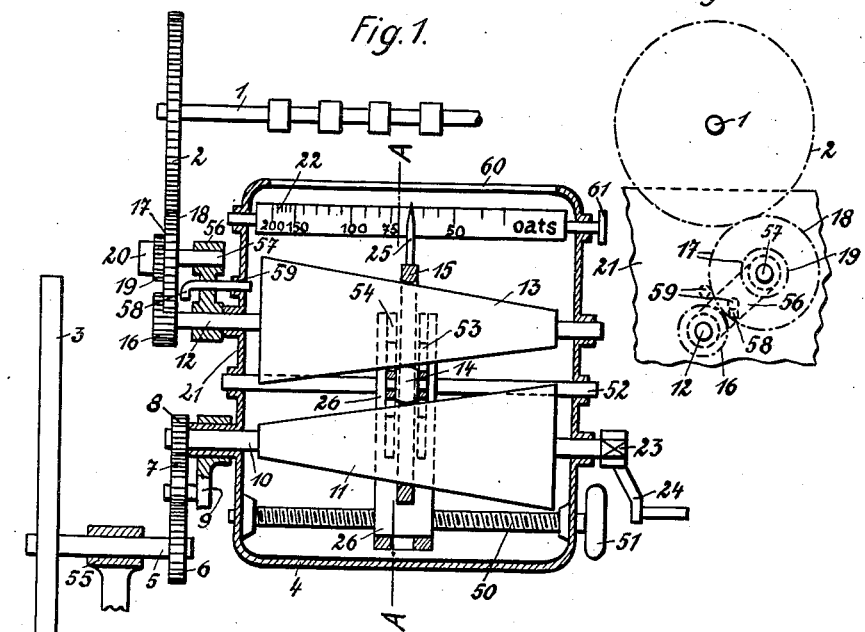
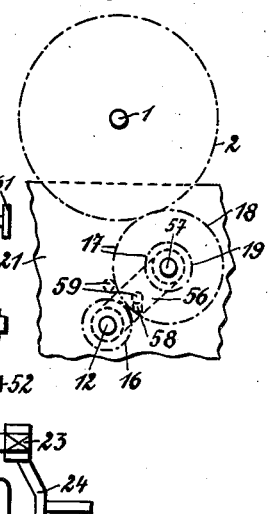
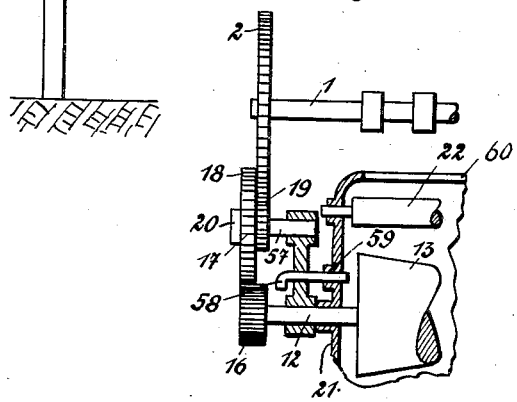
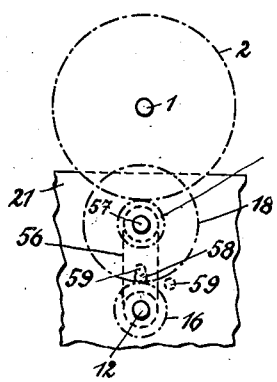

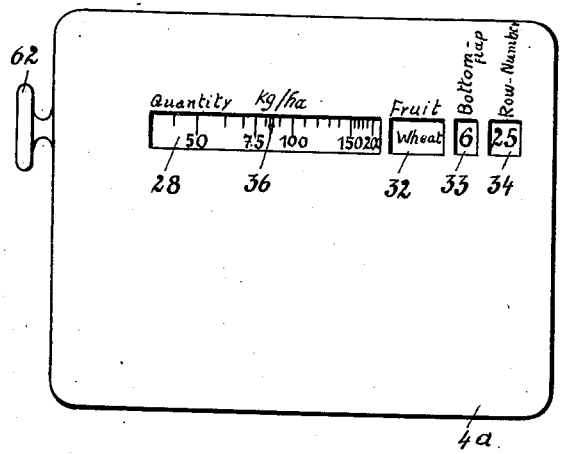
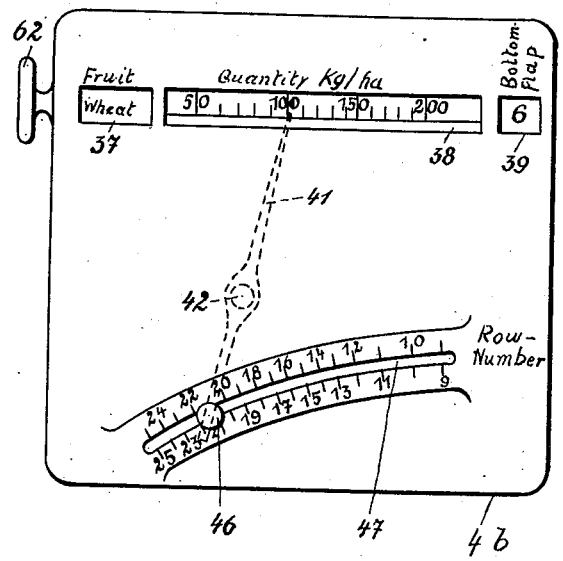

May 31, 1938.   H. SACK   2,119,059
DRIVING DEVICE FOR MULTIROW DRILL BARROWS OF FERTILIZER
SPREADING MACHINES WITH ROTARY DISTRIBUTING MEMBERS
Filed May 14, 1934   3 Sheets-Sheet 3

Patented May 31, 1938

2,119,059

UNITED STATES PATENT OFFICE 2,119,059

DRIVING DEVICE FOR MULTIROW DRILL BARROWS OF FERTILIZER SPREADING MACHINES WITH ROTARY DISTRIBUTING MEMBERS

Hans Sack, Leipzig, Germany

Application May 14, 1934, Serial No. 725,520
In Germany May 16, 1933

9 Claims. (Cl. 116—124)

This invention relates to driving devices and more especially to driving devices for feed shafts in drill barrows or fertilizer distributing machines having a speed gear driving said feed shaft and adapted to be adjusted for modifying the speed of said feed shaft.

The object of the invention is to provide means for indicating automatically quantities of seed or fertilizer fed by the feed shaft at any speed thereof and for changing said speed in a stepless manner.

Figure 9:
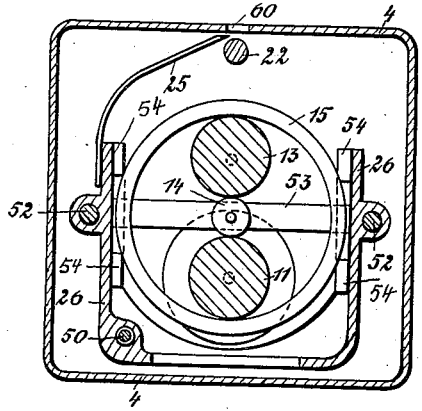
Figure 6:
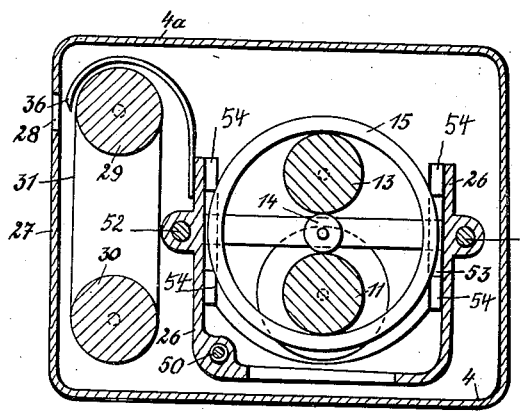
Figure 8:
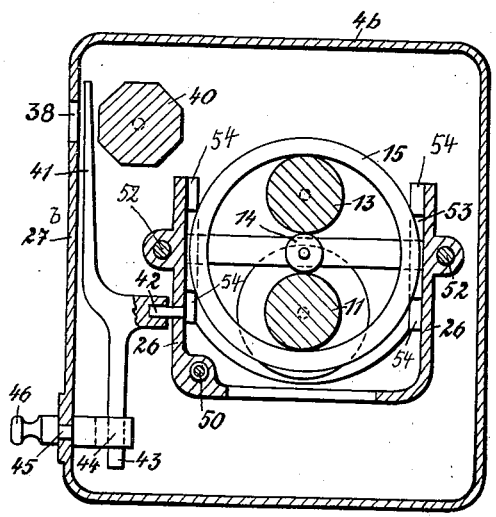

A device constructed according to the invention is illustrated diagrammatically and by way of example on the accompanying drawings on which Fig. 1 is a horizontal transverse section through one end of a drill barrow (or a fertilizer distributing machine) equipped with a device according to the invention, the members on the right hand side of the machine being omitted. Fig. 2 is a side view of a train of cog-wheels drawn in dotted lines, these wheels being the same as shown on the left hand side of Fig. 1 in full lines. Fig. 3 is a representation similar to a part of Fig. 1, the cog-wheels (which are again the same as in Fig. 1) being shown in another position. Fig. 4 is a representation similar to Fig. 2 showing the cog-wheels in the position of Fig. 3. Fig. 5 is an indicating device to be used in connection with the machine. Fig. 6 is a transverse vertical section through this indicating device in part. Fig. 7 is a view similar to Fig. 5 showing a modification of the indicating device. Fig. 8 is a transverse section through this modification. Fig. 9 is a vertical section on line A—A of Fig. 1.

On the drawings, 1 (Fig. 1) denotes one end of a feed or seeding shaft of a drill barrow, and 2 is a large cog-wheel affixed thereto. The shaft 1 is driven from a running or travelling wheel 3 of the machine by means of two trains of cog-wheels 6, 7, 8 and 16, 18 (or 16, 19 respectively, as more fully dealt with hereinafter) and of two conical drums 11 and 13 mounted in a casing 4 of which drum 13 is rotated from drum 11 by means of a friction roll 14 located between said drums and of a friction ring 15 encompassing them.

The roll 14 and the ring 15 are mounted in a casing or holder 26. The holder is carried by two guide rods 52 and a threaded spindle 50 arranged within the casing 4 in parallel relation to the axis of the drums. The holder 26 engages the spindle with corresponding threads and by rotating the spindle by means of a hand wheel 51 the holder 26 is shifted along the drums. For permitting such a shifting the roller 14 and the ring 15 are shiftable within the holder 26 transversely to the drums. The roll 14 is mounted on a slide 53 slidable in guides 54 of the holder 26. As is known the ratio of transmission between the drums depends on the position assumed by the ring and the roller in respect of the drums so that said ratio can be adjusted and modified by adjusting the holder by means of the spindle 50.

The drums 11 and 13 are affixed to shafts 10 and 12 respectively mounted in and extending from out of the casing 4. The wheels 8 and 16 are affixed to the shafts 10 and 12 respectively outside the casing. The wheels 3 and 6 are secured to a shaft 5 arranged in a stationary bearing 55 of the machine. The wheel 7 is located on an arm 9 turnable upon the shaft 10 and the wheels 18, 19 are mounted on a lever 56 turnable about shaft 12.

The wheels 18, 19 are of different size and connected rigidly forming a double wheel generally designed in the drawings by 17. The wheel 17 is rotatably arranged on a stud 57 secured to the lever 56 and, held on the stud by means of a nut 20. The double wheel 17 can be arranged in two different positions as will be seen by comparison of Figs. 1 and 3 in such a manner that either wheel 18 or wheel 19 meshes with wheel 2. The lever 56 is fixed in each position by means of a bolt 58 shifable in the lever 56 and adapted to engage alternately the one or the other of two bores 59 provided in adjacent side wall 21 of casing 4. In each position wheel 18 is meshing with wheel 16. It will be obvious that the shaft 1 in the case of Fig. 1 is rotated considerably faster than in the case of Fig. 3.

As generally known the amount of seed fed by the feed shaft depends on the speed of revolution of said shaft and thus on the ratio of transmission between it and the running wheel 3. Consequently the speed of the feed shaft is dependent on the positions of the holder 26 and of the wheels 18, 19. One or more scales are provided for indicating the amount of a certain kind of seed fed by the feed shaft on a certain unit of ground surfaces at different positions of the holder 26.

In the embodiment of Fig. 1 the roller 22 is provided carrying several scales for several kinds of seed, one scale for each kind of seed, each scale indicating the amount of seed fed by the feed shaft at different speeds thereof. The roller 22 is rotatably arranged within the casing in parallel relation to the shafts 10, 12 and in such a manner that a pointer 25, secured to the holder 26, will move along and over the roller 22 when the holder is shifted. The scales are provided in such a manner that the pointer 25 indicates in each position that amount of seed which is fed by the feed shaft on a certain unit of ground at that speed of the feed shaft which is produced by the friction cone gear in the said position of the holder 26 respectively of the ring 15 and roll 14. An aperture 60 is provided in the casing 4 for observing the position of the pointer 25 and the scale. The roller 22 is rotated by means of a knob 61 by hand for adjusting the scale provided for said kind of seed which may be sown in such a manner that the scale may be observed through the aperture and the holder 26 is adjusted so that the pointer 25 indicates that amount of seed which is wanted to be fed on a certain unit of ground surface. The scales on the roller may indicate the amounts of seed fed by the feed shaft if wheel 2 is driven by wheels 16 and 18.

The number of the teeth of the wheels 2 and 16, as well as those of the wheels 18 and 19, are preferably so chosen that when changing over these latter wheels from the position of Figs. 1 and 2 to the position of Figs. 3 and 4 the number of revolutions of the shaft 1 (Fig. 1) is divided by units, that is to say, it becomes one half or one third of its former value but not therebetween, and the reverse is, of course, the case when the wheels in question are changed over from the position of Figs. 3 and 4 to the position Figs. 1 and 2 when the number of revolutions of the shaft 1 will be increased the twofold or threefold.

The ratio between the graduations of the scales on the roller 22 corresponds with the ratio between the number of revolutions of the shaft 1, and wheel 3, and it can, therefore, be seen from the scales whether the amount of material sowed after the changing-over of the wheels 18, 19 in the one or the other way is one half of what it has been, or one third thereof, or double so much or threefold so much, etc. as the case may be at the time being.

In order to prevent mistakes as to the statements of the indicating device, the wheels 18 and 19 are provided with inscriptions or marks etc. on their sides which lie counter to one another. The larger wheel 18 may bear, for instance, the inscription "Amount of seed to be divided by 3". Besides, that side or face of the wheel which is not visible while the shaft 1 is running at a slow speed may have a specially selected color, for instance red.

The roller 22 may receive a separate scale permitting reading from it the correct amount of the seed distributed if the gear is used in position according to Fig. 3 without necessitating any computation. In this case that portion of the roller 22 where there is the said separate scale may show the same color as that side or face of the double wheel 17 that is visible from the left hand side of the device in Fig. 3 when the shaft 1 is driven by means of wheel 19.

In the arrangement illustrated in Fig. 1 the shaft 10 of the friction drum 11 has a square end 23 upon which a crank 24 can be slipped. The shaft 10 can be rotated by means of this crank 24 without lifting the running wheel 3 off the ground, when the machine is at a standstill and the cogwheel 7 has disengaged by correspondingly swinging the arm 9 on which it is mounted.

In the modified form of the indicating device illustrated in the Figs. 5 and 6 a casing 4a is provided similar to the casing 4 as described and adapted to receive a friction gear similar to that represented in Figs. 1 to 4, shown in vertical section in Fig. 6 of the drawings. Two rollers 29 and 30 carrying an endless band 31 having several graduated scales are mounted within the casing 4a. The roller 29 is firmly connected with an outer knob 62, like that of roller 22 by which it can be turned, the roller 30 being rotated by the band 31 in such a manner that the scale to be used at the time is visible behind a slot 28 provided in the front wall 27 of the casing 4a. A pointer 36 is fixed to the holder 26 and its indicating end is located between said slot and the band 31.

Every one of the several graduated scales on the band 31 appertains to a certain definite sort of seed, the name of which provided on the band 31 appears behind an aperture 32 in the casing 4a, in line with the slot 28 and behind another aperture 33 appear numbers provided in the band 31 and indicating the proper adjustment of the bottom flap of the machine, as suited for that sort of seed, and finally there is also an aperture 34 behind which the number indicating the number of rows appertaining to the operation just going on is visible which numbers are also provided on the band 31. Owing to the band 31 being comparatively long, it is possible to place upon it a comparatively large number of graduated scales suited for the purpose in view because quite different numbers of rows may be requisite for one and the same sort of seed. Concerning for instance a drill barrow of 4 meters breadth having 25 seed guides may sow wheat in 25, 23, 21 and 10 rows.

However, instead of making use of a plurality of graduated scales, as in Figs. 5 and 6, their number may be reduced to one for every sort of seed if the indicating device is designed in the manner of a computing table, as is the case in the constructional form illustrated in Figs. 7 and 8. In this modified form a casing 4b is used instead of casing 4 or 4a. There are three apertures 37, 38, 39 in the front wall 27b of the casing, and behind them is an eight-sided prism 40 which can be turned by means of the knob 62; it can assume, therefore, eight different positions and can show eight different graduated scales. Between the prismatic roller 40 and the front wall is a pointer 41 supported upon a pivot 42 provided on the holder 26 instead of pointer 25 or 36 as described above the position of which pointer 41 is changed when the gearing is adjusted. The pointer 41 forms a double-armed lever, the upper arm of which constitutes the pointer proper and the lower arm of which slidably engages the forked inner end 44 of a member 46 having a neck 45 which can be shifted in a curved slot 47 provided in the casing 4b. The member 46, the front position of which is shaped as a knob cooperates with two graduated scales or, more precisely with one scale divided into halves, the one half being located below the slot, the other above the same. The numerals of the graduation of said scale indicate the number of rows, and when the knob 46 has been adjusted with respect to any of these numerals, the other end of the pointer indicates upon the visible graduated scale on the prism 40 that amount of seed which corresponds to the numeral at the knob 46 and to the adjusted position of the gearing at the time being.

The pointer 41 can rotate freely about the pivot 42 because during the shifting of the member 46 it slides in the forked inner end 44 thereof. The pointer 41 need not always be swung to the graduation appearing in the aperture 38 in clockwise direction when the pivot 42 is in any position, but only when the gearing is so adjusted for the delivery of the greatest quantity of seed coming into question. This is the case when the shaft 12 rotates at maximum speed, that is when the pivot 42 is shifted farthest to the right (Fig. 7).

It may be necessary when employing the indicating device to take into consideration results obtained by experiments, because seeds of the same line are not always of the same consistency. The weight of a hectolitre of a certain kind of seed is not always the same and consequently the quantity of seed necessary for sowing 1 hectare of land will vary. Consequently, when using a seed for which it is known that the indicating device will not give the correct reading, it is necessary to carry out a test sowing in the manner explained by disengaging the wheel 7 and turning the shaft 10 by means of the crank. This test will enable the reading of the indicating device to be corrected by bringing the pointer on the numeral of the scale corresponding to the quantity of seed necessary for sowing a hectare as ascertained by the test.

It has to be understood that the gearing inserted between the distributing members of the machine and the driving running wheel may be designed in a variety of ways. The drawings show merely a constructional form by way of example. This constructional form is intended especially for small and light machines, in that the gearing requires but little place in spite of its large range of action, but it is well possible to employ friction wheels, the ratio of transmission of which can likewise be varied while the machine is at standstill.

I claim:

1. A driving device for feed shafts in drill barrows or fertilizer distributing machines, comprising in combination a feed shaft, a driving shaft, a speed gear for operatively connecting said shafts and adapted to be adjusted for modifying the ratio of transmission between said shafts, a travelling wheel adapted to rotate said driving shaft, a scale carrier having scales for different kinds of seed, each scale for indicating quantities of seed fed by said feed shaft at different speeds thereof for a certain unit of ground surface, said scale carrier stationarily arranged in spaced relation to said gear, an indicating member operatively connected with said gear and adapted to be adjusted therewith in modifying the ratio of transmission thereof and to move over said scale carrier when adjusted, said carrier adapted to be adjusted in certain different positions for putting alternately any one of said scales in indicating relation to said indicating member.

2. A driving device for feed shafts in drill barrows or fertilizer distributing machines comprising in combination a feed shaft, a driving shaft, a friction cone speed gear of the stepless variable type for operatively connecting said shafts and adapted to be adjusted for modifying the ratio of transmission between said shafts; a travelling wheel adapted to rotate the driving shaft, a scale carrier having scales for different kinds of seed, each scale for indicating quantities of seed fed by said feed shaft at different speeds thereof for certain unit of ground surface, said carrier arranged stationarily in spaced relation to said gear, an indicating member operatively connected with said gear and adapted to be adjusted therewith in modifying the ratio of transmission thereof and to move over said scale carrier when adjusted, said carrier adapted to be adjusted in certain different positions for putting alternately any one of said scales in indicating relation to said indicating member.

3. A driving device for feed shafts in drill barrows or fertilizer distributing machines, comprising in combination a feed shaft, a driving shaft, a friction speed gear for operatively connecting said shafts and adapted to be adjusted both in operation and while standing still for modifying the ratio of transmission between said shafts, a travelling wheel adapted to rotate said driving shaft, a scale carrier having scales for different kinds of seed, each scale for indicating quantities of seed fed by said feed shaft at different speeds thereof for a certain unit of ground surface, said carrier arranged stationarily in spaced relation to said gear, an indicating member operatively connected with said gear and adapted to be adjusted therewith in modifying the ratio of transmission thereof and to move over said scale carrier when adjusted, said carrier adapted to be adjusted in certain different positions for putting alternately any one of said scales in indicating relation to said indicating member.

4. A driving device for feed shafts in drill barrows or fertilizer distributing machines, comprising in combination a feed shaft, a driving shaft, a speed gear for operatively connecting said shafts and adapted to be adjusted for modifying the ratio of transmission between said shafts, a travelling wheel adapted to rotate said driving shaft, a rotary roller having scales for different kinds of seed, each scale for indicating quantities of seed fed by said feed shaft at different speeds thereof for a certain unit of ground surface, said roller arranged stationarily in spaced relation to said gear, an indicating member operatively connected with said gear and adapted to be adjusted therewith in modifying the ratio of transmission thereof and to move over said roller when adjusted, said roller adapted to be adjusted in different positions for putting alternately any one of said scales in indicating relation to said indicating member.

5. A driving device for feed shafts in drill barrows or fertilizer distributing machines, comprising in combination a feed shaft, a driving shaft, a friction cone speed gear of the stepless variable type for operatively connecting said shafts and adapted to be adjusted for modifying the ratio of transmission between said shafts, a travelling wheel adapted to rotate said driving shaft, a rotary roller having scales for different kinds of seed, each scale for indicating quantities of seed fed by said feed shaft at different speeds thereof for a certain unit of ground surface, said roller arranged stationarily in spaced relation to said gear, an indicating member operatively connected with said gear and adapted to be adjusted therewith in modifying the ratio of transmission thereof and to move over said roller when adjusted, said roller adapted to be adjusted in different positions for putting alternately any one of said scales in indicating relation to said indicating member.

6. A driving device for feed shafts in drill barrows or fertilizer distributing machines, comprising in combination a feed shaft, a driving shaft, a speed gear for operatively connecting said shafts and adapted to be adjusted for modifying the ratio of transmission between said shafts, a travelling wheel adapted to rotate said driving shaft, an endless band having scales for different kinds of seed, each scale indicating quantities of seed fed by said feed shaft at different speeds thereof for a certain unit of ground surface, said band arranged stationarily in spaced relation to said gear, rollers adapted to carry and move said band, an indicating member operatively connected with said gear and adapted to be adjusted therewith in modifying the ratio of transmission thereof and to move over said band when adjusted, said band adapted to be adjusted in different positions for putting alternately any one of said scales in indicating relation to said indicating member.

7. A driving device for feed shafts in drill barrows or fertilizer distributing machines, comprising in combination a feed shaft, a driving shaft, a friction cone speed gear of the stepless variable type for operatively connecting said shafts and adapted to be adjusted for modifying the ratio of transmission between said shafts, a travelling wheel adapted to rotate said driving shaft, an endless band having scales for different kinds of seed, each scale for indicating quantities of seed fed by said feed shaft at different speeds thereof for a certain unit of ground surface, said band arranged stationarily in spaced relation to said gear, rollers adapted to carry and move said band, an indicating member operatively connected with said gear and adapted to be adjusted therewith in modifying the ratio of transmission thereof and to move over said band when adjusted, said band adapted to be adjusted in different positions for putting alternately either one of said scales in indicating relation to said indicating member.

8. A driving device for feed shafts in drill barrows or fertilizer distributing machines, comprising in combination a feed shaft, a driving shaft, a speed gear for operatively connecting said shafts and adapted to be adjusted for modifying the ratio of transmission, between said shafts, a travelling wheel adapted to rotate said driving shaft for changing said ratio of transmission, a movable gearing part, a member carrying said movable part and adapted to change its position with the change of the ratio of transmission, a pointer rotatably carried by said member, a stationary scale carrier having a slot and one or more scales adjacent to said slot indicating number of rows of seeds to be sown, an element slidable and fixable in said slot and rotatably secured to one end of said pointer, said element adapted to be fixed in said slot opposite the figure indicating the number of rows to be sown, and an adjustable scale carrier having a plurality of scales for different kinds of seeds, said pointer adapted to move over said adjustable scale carrier and during the shifting of said member to indicate on one of the seed scales on said adjustable scale carrier the quantity of seed necessary for sowing a certain unit of the surface of ground in the number of rows indicated by the position of said element in said slot, said adjustable carrier adapted to be adjusted in different positions for putting alternately any one of said scales thereon in indicating relation to said pointer.

9. A driving device for feed shafts in drill barrows or fertilizer distributing machines, comprising in combination a feed shaft, a driving shaft, a friction cone speed gear of the stepless variable type for operatively connecting said shafts and adapted to be adjusted for modifying the ratio of transmission between said shafts, a travelling wheel adapted to rotate said driving shaft, a movable gearing part for changing said ratio of transmission, a member carrying said movable part and adapted to change its position with the change of the ratio of transmission, a pointer rotatably carried by said member, a stationary scale carrier having a slot and one or more scales adjacent to said slot indicating the number of rows of seeds to be sown, an element slidable and fixable in said slot and rotatably secured to one end of said pointer, said element adapted to be fixed in said slot opposite the figure indicating the number of rows to be sown, and an adjustable scale carrier having a plurality of scales for different kinds of seeds, said pointer adapted to move over said adjustable scale carrier and during the shifting of said member to indicate on one of the said scales on said adjustable scale carrier the quantity of seed necessary for sowing a certain unit of the surface of ground in the number of rows indicated by the position of said element in said slot, said adjustable carrier adapted to be adjusted in different positions for putting alternately any one of said scales thereon in indicating relation to said pointer.

HANS SACK.